United States Patent
Smith

(10) Patent No.: US 9,608,720 B2
(45) Date of Patent: Mar. 28, 2017

(54) SYSTEM FOR TESTING PASSIVE OPTICAL LINES

(71) Applicant: ADC Telecommunications, Inc., Berwyn, PA (US)

(72) Inventor: Trevor D. Smith, Eden Prairie, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 20 days.

(21) Appl. No.: 14/066,084

(22) Filed: Oct. 29, 2013

(65) Prior Publication Data

US 2014/0193147 A1  Jul. 10, 2014

Related U.S. Application Data

(60) Provisional application No. 61/719,787, filed on Oct. 29, 2012.

(51) Int. Cl.
*H04B 10/08* (2006.01)
*H04B 17/00* (2015.01)
(Continued)

(52) U.S. Cl.
CPC ............ *H04B 10/077* (2013.01); *G02B 6/28* (2013.01); *H04B 10/071* (2013.01);
(Continued)

(58) Field of Classification Search
CPC .. H04B 10/077; H04B 10/071; H04B 10/073; G02B 6/28; G02B 6/3846; G02B 6/4441; G02B 6/3502; G02B 6/3849
(Continued)

(56) References Cited

U.S. PATENT DOCUMENTS 4,877,306 A   10/1989  Kar
5,241,613 A * 8/1993  Li ........................... G02B 6/02
                                              385/29
(Continued)

FOREIGN PATENT DOCUMENTS

EP    0 846 943 A2   6/1998
JP    2006-203823 A   8/2006
(Continued)

OTHER PUBLICATIONS

International Search Report and Written Opinion for PCT/US2013/066028 mailed Jan. 28, 2014.
(Continued)

*Primary Examiner* — Ken N Vanderpuye
*Assistant Examiner* — Abbas H Alagheband
(74) *Attorney, Agent, or Firm* — Merchant & Gould P.C.

(57) ABSTRACT

An optical splitter assembly including a splitter housing, a passive optical power splitter positioned within the splitter housing and a plurality of splitter output pigtails that extend outwardly from the splitter housing. Each of the splitter output pigtails including an optical fiber structure having a first end optically coupled to the passive optical power splitter and a second end on which a fiber optic connector is mounted. Each of the splitter output pigtails having a different test characteristic such that the splitter output pigtails can be individually identified during optical network testing.

4 Claims, 7 Drawing Sheets

(51) Int. Cl.
*H04B 10/077* (2013.01)
*H04B 10/071* (2013.01)
*G02B 6/28* (2006.01)
G02B 6/38 (2006.01)
G02B 6/44 (2006.01)
G02B 6/35 (2006.01)
H04B 10/073 (2013.01)

(52) U.S. Cl.
CPC .......... *G02B 6/3502* (2013.01); *G02B 6/3846* (2013.01); *G02B 6/3849* (2013.01); *G02B 6/4441* (2013.01); *H04B 10/073* (2013.01)

(58) Field of Classification Search
USPC .......... 398/16, 17, 20, 23, 33; 385/126, 127, 385/128, 73, 97, 98, 77–80, 99, 95, 29, 35, 385/36
See application file for complete search history.

(56) References Cited

U.S. PATENT DOCUMENTS

| | | | | |
|---|---|---|---|---|
| 6,454,465 | B1* | 9/2002 | Uschitsky | G02B 6/29364 385/34 |
| 6,456,370 | B1* | 9/2002 | Ingles, Jr. | G01M 11/088 356/73.1 |
| 6,498,888 | B1* | 12/2002 | Chenard | G02B 6/03627 372/45.01 |
| 6,715,933 | B1 | 4/2004 | Zimmer et al. | |
| 6,766,115 | B1 | 7/2004 | Sorin et al. | |
| 7,218,827 | B2 | 5/2007 | Vongseng et al. | |
| 7,329,049 | B2* | 2/2008 | Meek | G02B 6/3801 385/134 |
| 7,636,507 | B2* | 12/2009 | Lu | G02B 6/3825 385/135 |
| 7,809,235 | B2* | 10/2010 | Reagan | G02B 6/3849 385/135 |
| 7,956,992 | B2* | 6/2011 | Watte | G02B 6/3846 356/73.1 |
| 8,374,476 | B2* | 2/2013 | Reagan | G02B 6/3849 385/134 |
| 8,482,725 | B2* | 7/2013 | Perron | G01M 11/3118 356/73.1 |
| 8,588,571 | B1* | 11/2013 | Lam | G02B 6/3825 385/135 |
| 8,687,957 | B2* | 4/2014 | Perron | H04B 10/0795 398/25 |
| 8,711,341 | B2* | 4/2014 | Blair | G01M 11/3136 356/73.1 |
| 9,016,953 | B2* | 4/2015 | Ott | G02B 6/3821 264/1.25 |
| 9,276,673 | B2* | 3/2016 | Smith | H04B 10/073 |
| 2002/0140926 | A1* | 10/2002 | Ingles, Jr. | G01M 11/088 356/73.1 |
| 2005/0207710 | A1* | 9/2005 | Tanaka | G02B 6/4209 385/78 |
| 2006/0008231 | A1* | 1/2006 | Reagan | G02B 6/3849 385/135 |
| 2006/0263029 | A1* | 11/2006 | Mudd | G02B 6/4442 385/135 |
| 2006/0285807 | A1* | 12/2006 | Lu | G02B 6/3825 385/92 |
| 2007/0036507 | A1 | 2/2007 | Allen et al. | |
| 2007/0147741 | A1* | 6/2007 | Meek | G02B 6/3801 385/55 |
| 2008/0019646 | A1* | 1/2008 | deJong | G02B 6/2558 385/99 |
| 2008/0152292 | A1* | 6/2008 | Wilken | G02B 6/4452 385/135 |
| 2008/0297773 | A1* | 12/2008 | Blair | G01M 11/3136 356/73.1 |
| 2009/0110359 | A1* | 4/2009 | Smith | G02B 6/4452 385/135 |
| 2009/0115999 | A1* | 5/2009 | Watte | G02B 6/3846 356/73.1 |
| 2009/0208177 | A1* | 8/2009 | Smith | H04B 10/271 385/135 |
| 2009/0268197 | A1* | 10/2009 | Perron | G01M 11/3136 356/73.1 |
| 2009/0269054 | A1* | 10/2009 | Smith | H04B 10/0773 398/25 |
| 2010/0183276 | A1* | 7/2010 | Smith | G02B 6/4452 385/135 |
| 2010/0226615 | A1* | 9/2010 | Reagan | G02B 6/4452 385/135 |
| 2011/0019966 | A1* | 1/2011 | Reagan | G02B 6/3849 385/135 |
| 2011/0293277 | A1* | 12/2011 | Bradea | H04J 14/0282 398/66 |
| 2011/0311226 | A1* | 12/2011 | Smith | G02B 6/483 398/45 |
| 2012/0045205 | A1* | 2/2012 | Perron | H04B 10/0795 398/48 |
| 2013/0004130 | A1* | 1/2013 | Barnes | G02B 6/3846 385/81 |
| 2014/0050451 | A1* | 2/2014 | Reagan | G02B 6/3849 385/135 |
| 2014/0111795 | A1 | 4/2014 | Barnhart et al. | |
| 2015/0093091 | A1* | 4/2015 | Reagan | G02B 6/3849 385/135 |
| 2016/0178851 | A1* | 6/2016 | Lu | G02B 6/3846 385/28 |

FOREIGN PATENT DOCUMENTS

JP 2011-69721 4/2011
WO WO 2014/063034 4/2014

OTHER PUBLICATIONS

Bentz, C. et al., "Combinatorial wavelength selective minor concatenation for unambiguous subscriber line monitoring in FTTH/PON with high subscriber counts," Photonics Conference (PHO), pp. 933-934 (Oct. 9, 2011).

European Search Report for Application Serial No. 13850254.7 mailed Jun. 28, 2016.

Yuksel, K. et al., "Optical Layer Monitoring in Passive Optical Networks (PONs): A Review," 10th Anniversary International Conference on Transparent Optical Networks, ICTON 2008, pp. 92-98 (Jun. 22, 2008).

* cited by examiner

SYSTEM FOR TESTING PASSIVE OPTICAL LINES

CROSS-REFERENCE TO RELATED APPLICATION

The present application claims the benefit of U.S. Provisional Patent Application Ser. No. 61/719,787, filed Oct. 29, 2012, which application is hereby incorporated by reference in its entirety.

BACKGROUND

Fiber-to-the-home (FTTH) network is a form of fiber optic communication delivery in which the fiber extends from the central office to the subscriber's premises. In the event a user loses a signal in the network, troubleshooting the problem requires isolating it to the physical layer or the active components, which are downstream in the network. Isolating the problem to the physical layer is particularly important because the physical layer tends to be vast, extending for many miles—thus it is critical to narrow the geographical area in which the problem lies.

Systems are available to manage and test the network for disruptions along the entire length of the cable. Most systems commonly used today need something in the fiber line, such as a filter, in order to test the network utilizing optical time domain reflectometer (OTDR) technology. OTDR measures reflective and non-reflective events in the network to determine and locate fault in the fiber optic.

A need remains for an improved cost effective system that may continually test FTTH networks in a time-efficient and reliable manner.

SUMMARY

In general terms, this disclosure is directed to an optical splitter assembly and system for testing passive optical lines. In one possible configuration, and by non-limiting example, an optical splitter assembly includes a splitter housing, a passive optical power splitter positioned within the splitter housing, and a plurality of splitter output pigtails that extend outwardly from the splitter housing. Each of the splitter output pigtails include an optical fiber structure that has a first end optically coupled to the passive optical power splitter and a second end on which a fiber optic connector is mounted. Each of the splitter output pigtails has a different test characteristic (i.e., an individual trait, characteristic, property, fingerprint, signature, etc.) such that the splitter output pigtails can be individually identified during optical network testing.

One aspect is a passive optical network (PON) having an optical line terminal (OLT) system including a monitoring system. The system includes a central office, an optical splitter assembly, a fiber distribution hub, drop terminals, and optical network terminals. The central office having a feeder optical fiber extending therefrom into the optical splitter assembly. The plurality of connectorized pigtails being coupled to the passive optical power splitter at one end and a fiber optic connector on a second end. The fiber optic connectors are mounted to a fiber optic adapter panel and configured to be coupled to drop terminals for connection to housing premises. The monitoring system isolates/identifies at least one characteristic of an optical fiber from the entire optical fiber network.

DETAILED DESCRIPTION

Figure 1:
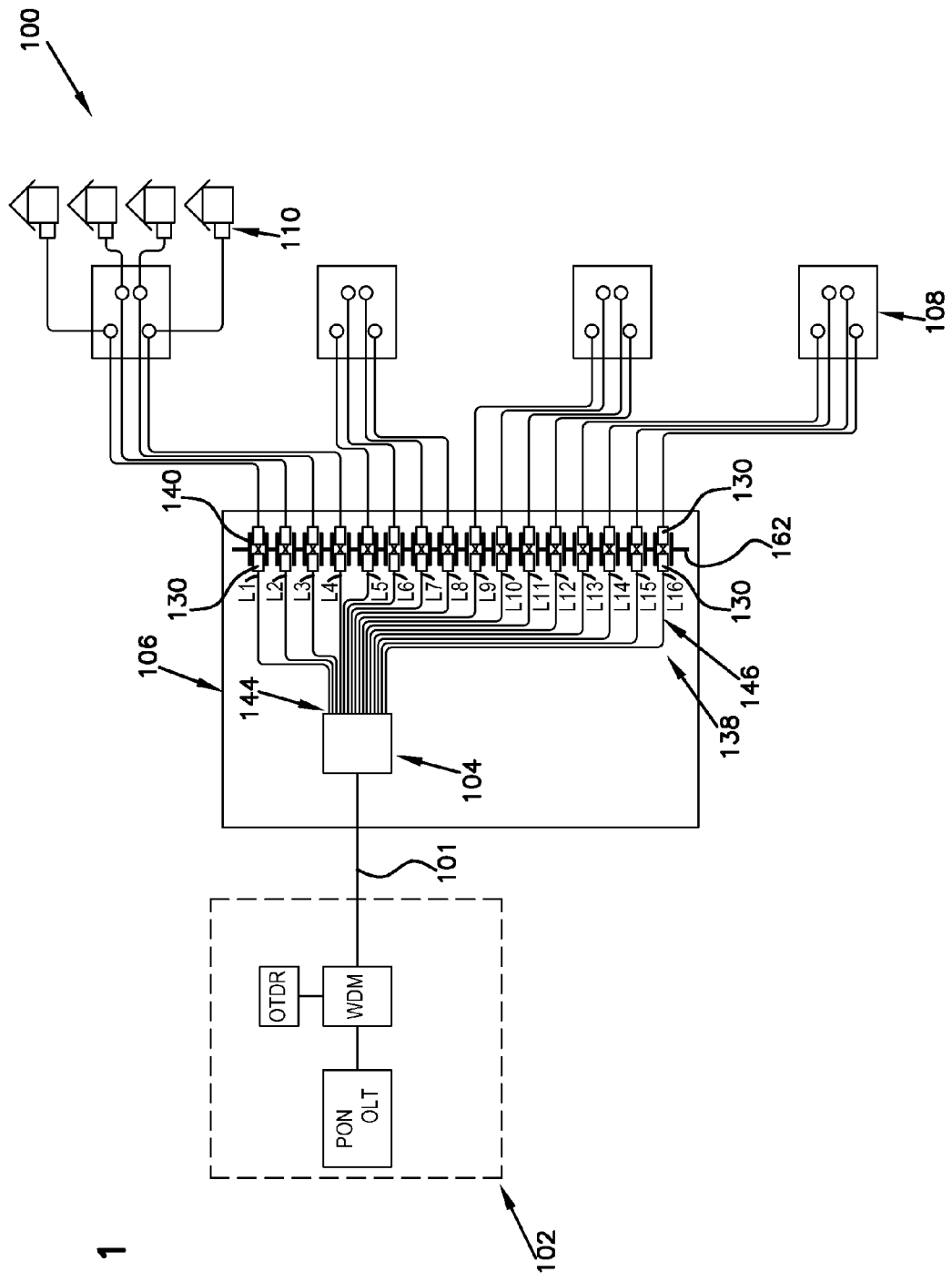
FIG. 1 shows a schematic view of an optical network in accordance with the principles of the present disclosure.

Various embodiments will be described in detail with reference to the drawings, wherein like reference numerals represent like parts and assemblies throughout the several views. Reference to various embodiments does not limit the scope of the present disclosure. Additionally, any examples set forth in this specification are not intended to be limiting and merely set forth some of the many possible examples for the practicing the aspects disclosed herein.

FIG. 1 is a schematic view of an example of an optical network system having a built-in test monitoring system. In this example, the optical network system 100 generally includes a central office 102, an optical splitter assembly 104, a fiber distribution hub 106, drop terminals 108 and optical network terminals 110.

The optical network system 100 forms an optical Wavelength Division Multiplexing (WDM) network with built-in passive optical network fiber monitoring system. The entire optical network system 100 can be tested continuously, in real time, to identify fault in individual lines using an optical time domain reflectometer (OTDR) technique. The feeder fiber 101 couples to an optical splitter assembly including a passive optical power splitter. The optical fibers are configured to have a unique signature so that each line between the Central Office and the Optical Network Terminals (ONT) can be separately identified and monitored using OTDR technology.

The optical splitter assembly 104 provides for the optical fibers to each have signature characteristics based on individual fiber lengths. For example, the optical splitter assembly 104 can be configured so that different fiber lengths are provided between the passive optical splitter and connectorized ends of pigtails of the optical splitter assembly 104. The different fiber lengths provide different optical characteristics that can be specifically identified using OTDR technology. Providing different optical fiber lengths at the optical splitter assembly 104 assures that each line of the system (i.e., each line measured from the Central Office to the ONT) has a different length and therefore a unique OTDR signature. The signature characteristic may also be obtained by configuring unique fibers generally within a fiber optic connector 130, specifically a ferrule assembly 132 (see FIG. 4). For example, each pigtail of the optical splitter assembly 104 can include a fiber optic connector 130 including an optical fiber stub 152 having a unique optical trait (i.e., signature, characteristic) that allows the pigtail to be uniquely identified. In one embodiment, the optical fiber stub 152 is spliced to a main length of fiber of the pigtail within the fiber optic connector 130. The optical splitter assembly 104 is illustrated and described in more detail with reference to FIGS. 2-3. The fiber optic connector 130 and ferrule assembly 132 are illustrated and described in more detail with reference to FIGS. 4-6.

The passive optical network fiber monitoring system allows a service provider to uniquely identify each individual fiber from the fiber optic network for identifying discrepancies, monitoring service and identifying failure. The passive optical network fiber monitoring system is illustrated and described in more detail with reference to FIG. 7.

Figure 2:
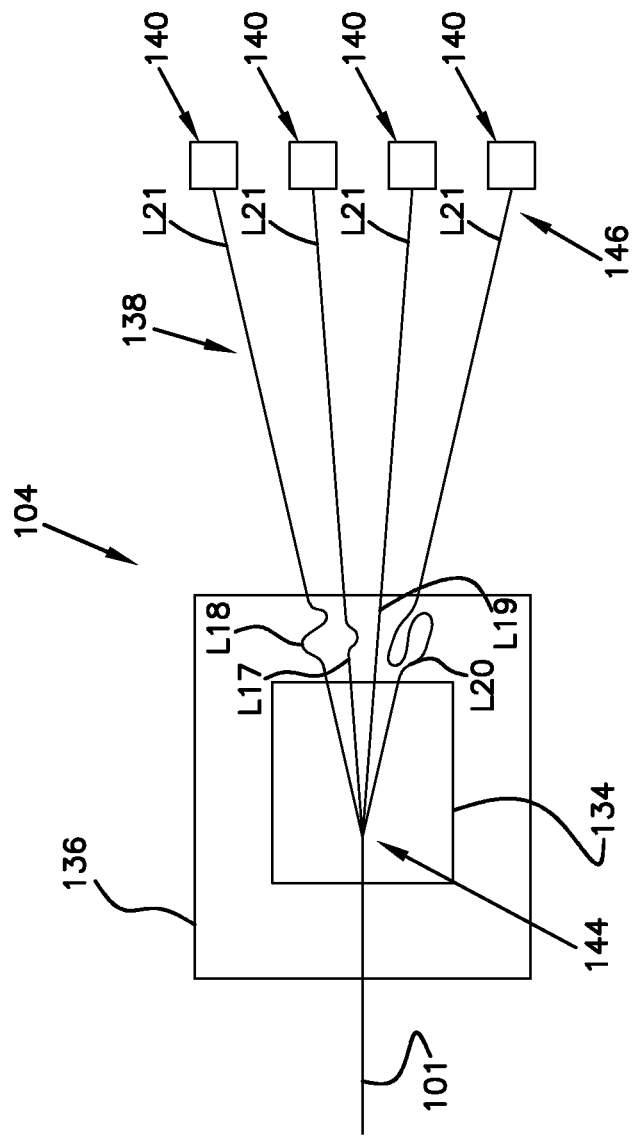
FIG. 2 shows a schematic view of an optical splitter assembly adapted for use in systems such as the system of FIG. 1.
Figure 3:
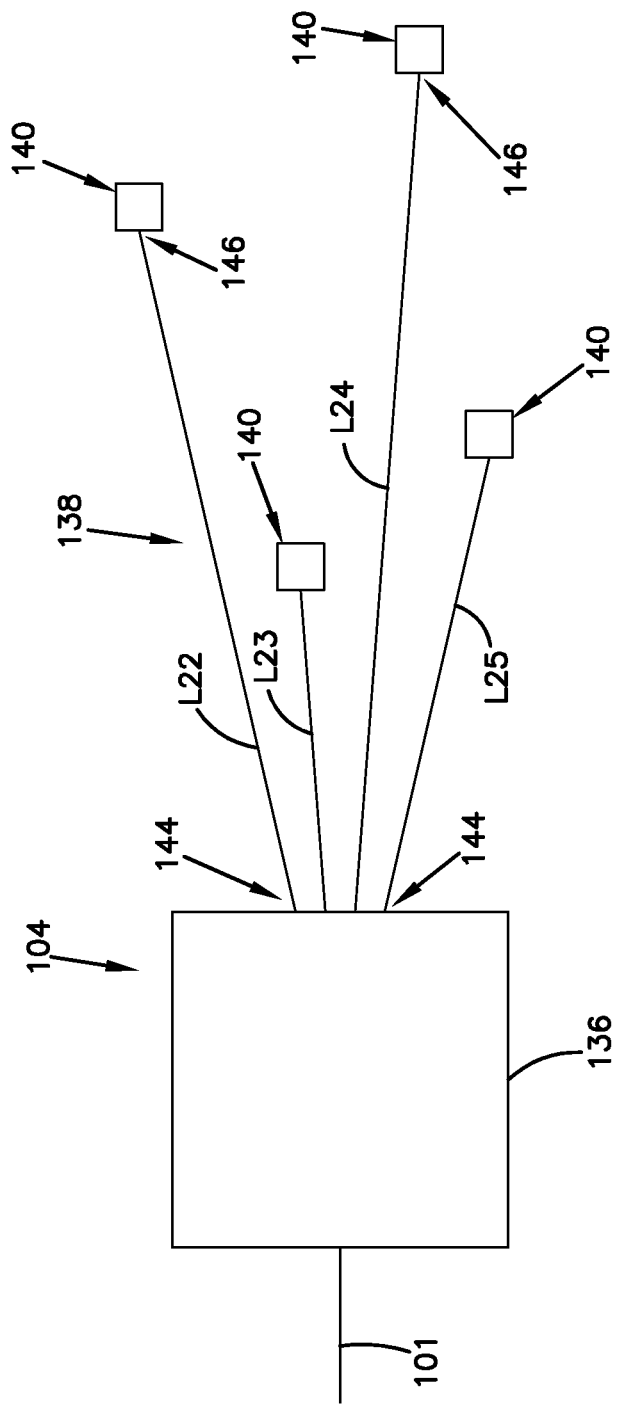
FIG. 3 shows a schematic view of another optical splitter assembly adapted for use in systems such as the system of FIG. 1 illustrating fibers split outside of the optical splitter assembly.

FIG. 2 illustrates features of the optical splitter assembly 104. FIG. 2 is a schematic view of the optical splitter assembly 104. In this example, the optical splitter assembly 104 includes a passive optical power splitter 134, a splitter housing 136, and a plurality of connectorized pigtails 138 extending from the splitter assembly 104. The splitter housing 136 surrounds and encloses the passive optical power splitter 134. The plurality of connectorized pigtails 138 extend from the optical splitter assembly 104 and can include connectorized ends. In some embodiments, each of the plurality of connectorized pigtails 138 can be coupled at one end to a fiber optic adapter 140 on a distribution panel 142 of a fiber distribution hub 106.

As shown in FIG. 1, the passive optical power splitter 134 has a 1×16 splitter. In other examples, the passive optical power splitter 134 may include other splitter dimensions, such as, but not limited to, 1×4, 1×8, 1×32, or 1×64. FIG. 2 shows a passive optical power splitter 134 that has a 1×4 splitter. The passive optical power splitter 134 is arranged and configured to optically couple a feeder fiber 101 into individual fiber lines. The feeder fiber 101 can be coupled to the passive optical power splitter 134 inside the splitter housing 136. The feeder fiber 101 can be optically coupled to multiple optical fibers with each individual optical fiber having a different fiber length. For example, the fiber lines each have different fiber lengths L1-L16 as shown with a second end 146 referred to as a "pigtail." The ends 146 of each fiber line can be connected to fiber optic connectors 130 and are referred to as the plurality of connectorized pigtails 138. The individual optical fibers are each coupled to the passive optical power splitter 134 at a first end 144 and a second end 146 extends from the splitter housing 136. The second end 146 can be referred to as a "pigtail" or "free end portion." A fiber optic connector 130 can be mounted to the second end 146 of each of the plurality of connectorized pigtails 138.

FIG. 2 depicts an enlarged schematic view of the feeder fiber 101 within an optical splitter assembly 104 and the plurality of connectorized pigtails 138 extending therefrom. Unique optical cables can be created with a signature characteristic that can be individually identified using OTDR technology. The signature characteristic can be configured in different ways. For example, in FIG. 2 the signature characteristic of each fiber line split from the feeder fiber 101 can be related to provide the split outputs with different lengths. In one example, each of the fiber lines can have different lengths L17-L20 inside the splitter housing 136 while having the same line length L21 extending from the splitter housing 136 to each fiber optic connector 130. The different lengths for each fiber line within the splitter housing 136 provides for a signature characteristic unique to each. This allows each fiber line to be uniquely identified when monitoring or testing an optical network for faults or disruptions. In FIG. 2, the internal length variation is schematic and it will be appreciated that all fiber routing within the splitter housing complies with minimum bend radius requirements for the optical fibers.

In other embodiments, the signature characteristic of each line split from the feeder fiber 101 can be achieved outside of the splitter housing 136. For example, in FIG. 3, the signature characteristic of each fiber line is obtained outside of the splitter housing 136 by varying the lengths of the pigtails extending form the splitter housing 136 to the fiber optic connector 130. This creates various lengths of the fiber lines extending from the splitter housing 136. The fiber lines each have a different fiber length L22-L25 (shown schematically) as shown with a second end 146 referred to as a "pigtail." The ends 146 of each fiber line can be connected to fiber optic adapters 140 and are referred to as the plurality of connectorized pigtails 138. The various fiber lengths L22-L25 can create a signature characteristic to allow each fiber line to be uniquely identified during monitoring or testing of disruptions or faults in the optical network. It should be understood that alternative ways can be used to achieve unique signature characteristics for optical cable lines, such as, but not limited to, the type of optical cable, or reflector filters placed inside an optical ferrule, etc. In another example, the fiber lengths L22-L25 progressively increase from the first fiber output L22 to the last fiber output L25.

Figure 4:
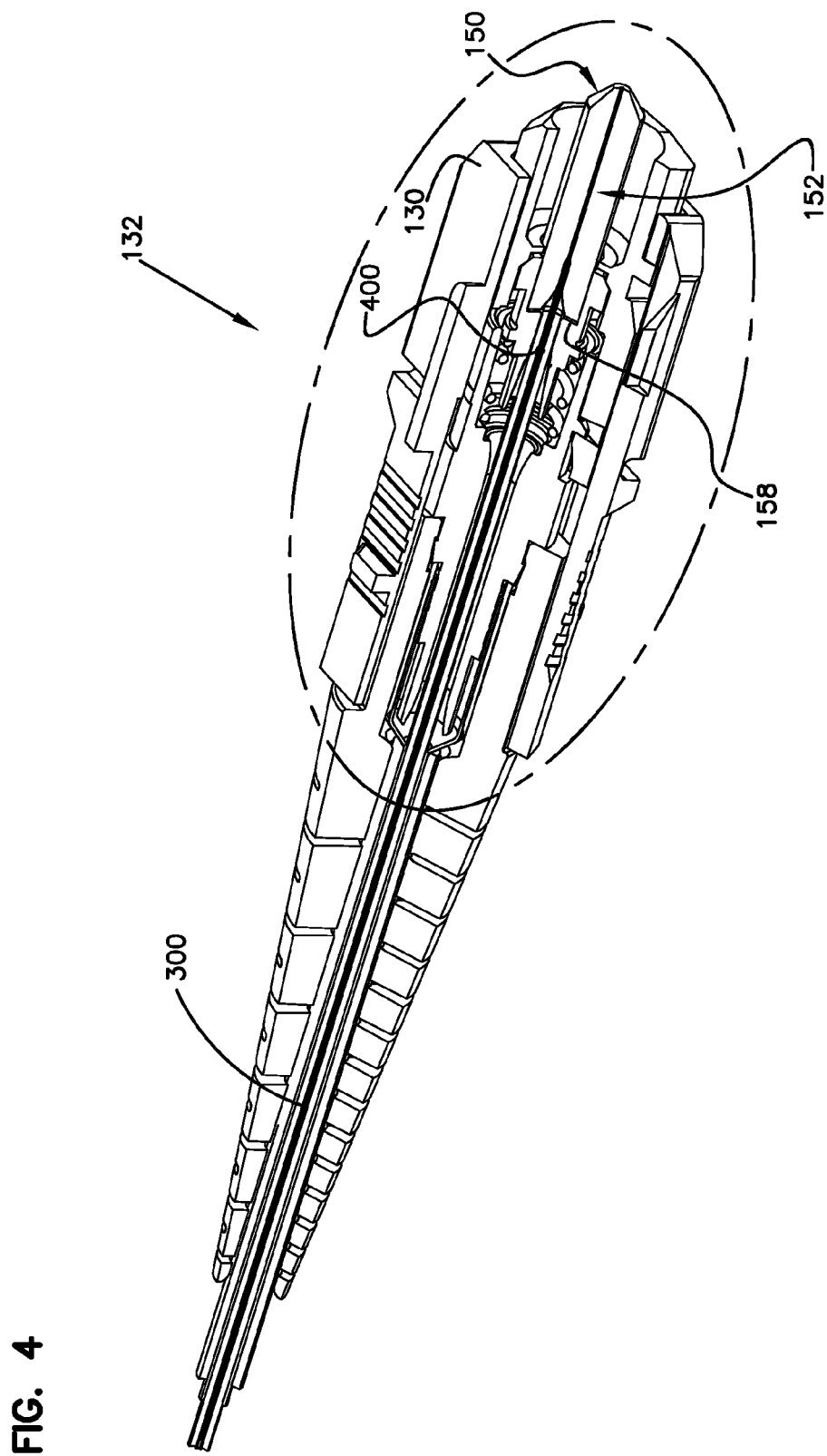
FIG. 4 shows a perspective view of a fiber optic connector and ferrule in accordance with the principles of the present disclosure.
Figure 5:
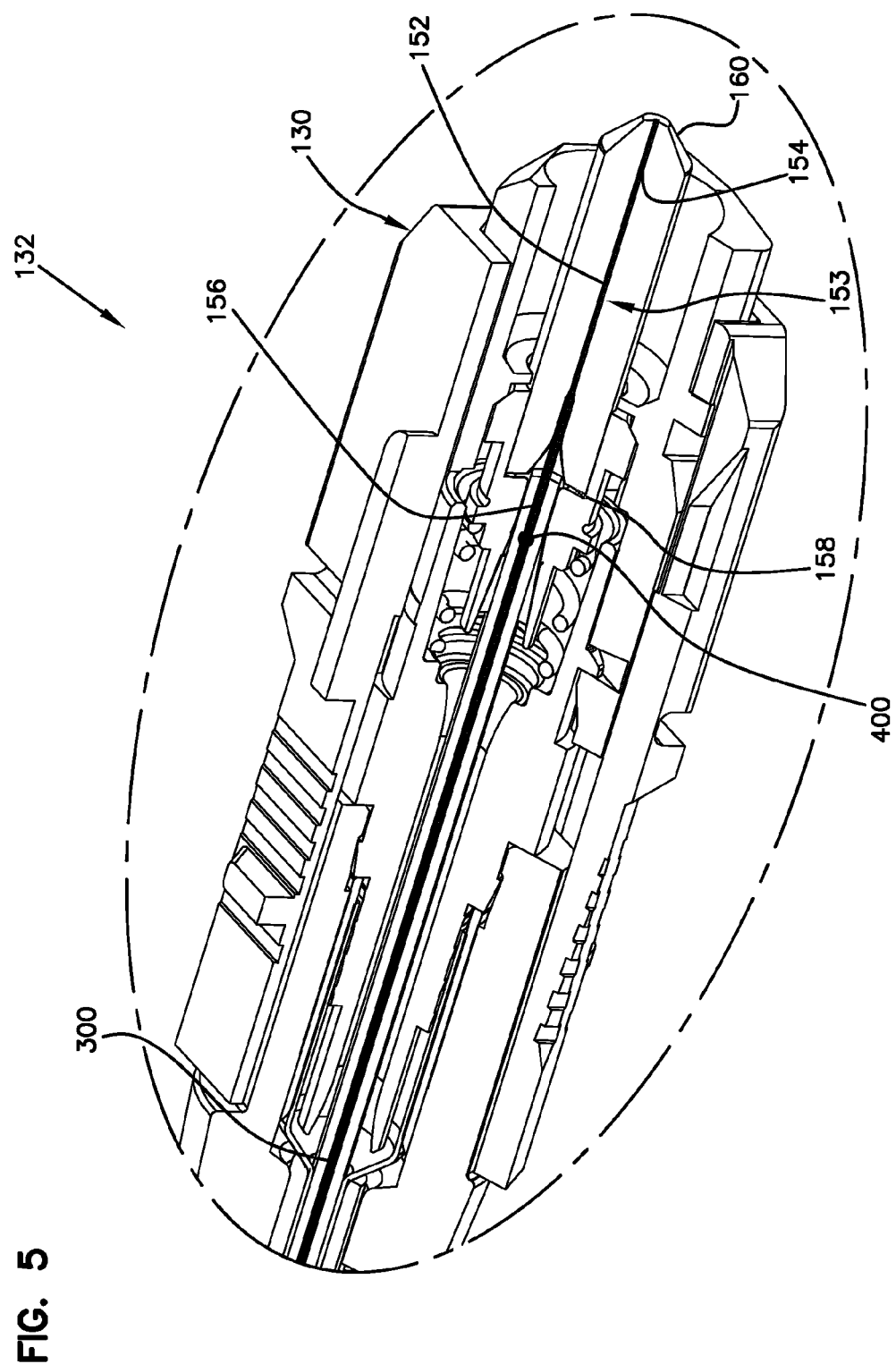
FIG. 5 shows an enlarged view of a partial of FIG. 4.
Figure 6:
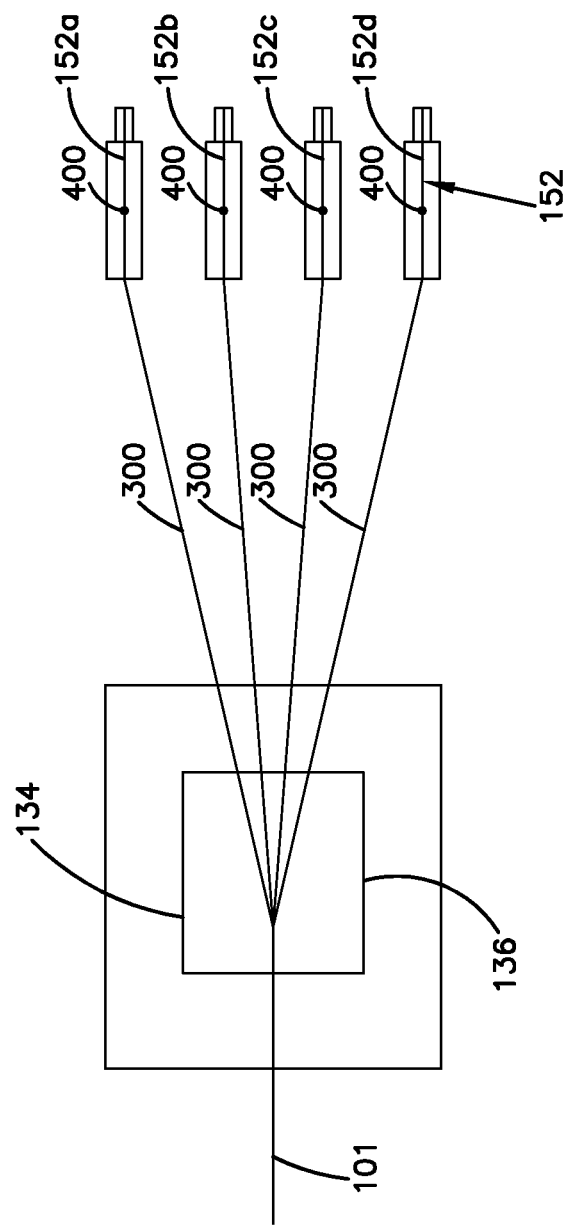
FIG. 6 shows a schematic view of another optical splitter assembly adapted for use in systems such as the system of FIG. 1 illustrating a fiber stub supported within a ferrule assembly.

FIGS. 4-6 illustrate features of the fiber optic connector 130 and ferrule assembly 132. FIG. 4 is a perspective view of the fiber optic connector 130 and ferrule assembly 132. It should be understood that the fiber optic connectors 130 may be any known single or multi-fiber connector, including, for example, traditional SC, ST and FC-type connectors, small form factory designs, such as, MU and LC connectors, and multi-fiber connectors such as the MTRJ, MPX, and MPO-type connectors.

In one example, customized optical fiber stubs can be used to provide a signature characteristic for the fiber lines split from the feeder fiber 101 without modifying the fiber lengths L1-L16 inside the splitter housing 136 or outside the splitter housing 136. In this example, the ferrule assembly 132 can include a ferrule 150 and an optical fiber stub 152 secured to the ferrule 150. The optical fiber stub 152 can be referred to as a "unique optical fiber stub." Each optical fiber stub 152 supported within the ferrules 150 of the fiber optic connectors 130 corresponding to each splitter can have different optical properties.

The optical fiber stub 152 can be manufactured using a precision fiber having tightly toleranced parameters such as core to cladding concentricity and cladding outer diameter variation. In this regard, in certain embodiments, the optical fiber stub 152 can be different (e.g., can have a different construction, different mechanical characteristics, different physical attributes, different optical performance characteristics, different degrees of precision, etc.) than the main optical fiber 300 extending form the stub to the splitter. For example, the optical fiber stub 152 can be more precisely manufactured optical fiber than the main optical fiber 300 of the remainder of the pigtail (i.e., the stub fiber is manufactured according to tighter tolerances than the cable optical fiber). For example, in certain embodiments, the optical fiber stub 152 can have better average core to cladding concentricity than the main optical fiber 300. Also, the outer diameter of the cladding of the optical fiber stub 152 can be more precisely toleranced that the outer diameter of the cladding of the main optical fiber 300. Further, the optical fiber stub 152 can have a different (e.g., lower) fiber cut-off wavelength than the main optical fiber 300. Moreover, the optical fiber stub 152 can have different cladding mode suppression characteristics as compared to the main optical fiber 300. For example, as compared to the main optical fiber 300, the optical fiber stub 152 can have a construction adapted to provide enhanced cladding mode suppression for suppressing modal interference. Example optical fibers having constructions adapted to reduce/suppress modal interference are disclosed at U.S. Pat. Nos. 6,498,888; 5,241,613; and 4,877,306, which are hereby incorporated by reference in their entireties.

It is well known in the art that splices can introduce losses (e.g., insert loss, return loss). However, fiber optic cables and connectors of the present disclosure include various features that provide excellent performance despite the presence of an internal splice. Such features include: a) precise core-to-core alignment of the spliced optical fibers; b) precise centering of the optical fiber stub 152 within a ferrule bore, precise tuning of the core offset direction within the connector body, and precise centering of the ferrule bore within the ferrule 150.

The optical fiber stub 152 includes a first portion 154 secured within the ferrule bore 153 and a second portion 156 that extends rearwardly from a rear end 158 of the ferrule 150. The ferrule assembly 132 is positioned at least partially within the fiber optic connector 130. Specifically, the ferrule assembly 132 is positioned with the ferrule 150 positioned adjacent to the front end 160 of the fiber optic connector 130. As used herein, the word "adjacent" means at or near. In a preferred embodiment, the optical fiber connector 130 is compatible with existing connectors, fiber optic adapter, patch panels and fiber optic cables.

The fiber optic connector 130 further includes the optical fiber stub 152 supported within the ferrules 150 of the fiber optic connectors 130 are fusion spliced 400 or otherwise couple to the main optical fibers 300 within the ferrule assembly 132. The fusion splice is positioned at the splice location 400 spaced from a rear end 158 of the ferrule 150. In one embodiment, the splice location is within the fiber optic connector 130 and is preferably a factory fusion splice. A "factory fusion splice" is a splice performed at a manufacturing facility as part of a manufacturing process. In one embodiment, the fiber optic connector 130 fully complies with Telcordia GR-326 or similar stringent industry or customer specifications.

In a preferred embodiment, the splice location is relatively close to the rear end 158 of the ferrule 150. For example, in one embodiment, the splice location is no more than 15 mm from the ferrule 150. In another embodiment, the splice location is no more than 10 mm from the ferrule 150. In still another embodiment, the splice location is no more than 5 mm from the ferrule 150. In further embodiments, the splice location is spaced 1-20 mm from the ferrule 150, or 1-15 mm from the ferrule 150 or spaced 1-10 mm from the ferrule 150, or 1-5 mm from the ferrule 150, or 2-10 mm from the ferrule, or 2-5 mm from the ferrule 22. Example ferrule and fiber optic connectors are disclosed at U.S. patent application Ser. No. 61/666,683, which is hereby incorporated by reference in its entirety.

To provide each of the splitter outputs with a different signature, the stub fibers 152 (152a, 152b, 152c, 152d) of each connectorized pigtail shown in FIG. 6 can have a different test characteristic (e.g., reflective characteristic, return loss characteristic, insertion less characteristic, model interference suppression characteristic, different core to cladding concentricities, different fiber cut-off wavelengths, different cladding modal suppression characteristics, etc.)

Referring again to FIG. 1, the fiber optic connector 130 is received within a fiber optic adapter 140 on a panel 142. The fiber distribution hub 106 contains the splitter housing 136 and the plurality of connectorized pigtails 138 coupled to the fiber optic adapters 140 on the panel 142.

The central office 102 transmits various optical signals for internet, television, video on demand, and other telecommunications down a physical layer comprising fibers. Each fiber within a cable exiting the fiber distribution hub 106 enters a drop terminal 108. The fibers exit the drop terminal 108 and are connected to an optical network terminal 110 located on a user's premises. In this example, a discrete fiber corresponds to a single user's premises.

Figure 7:
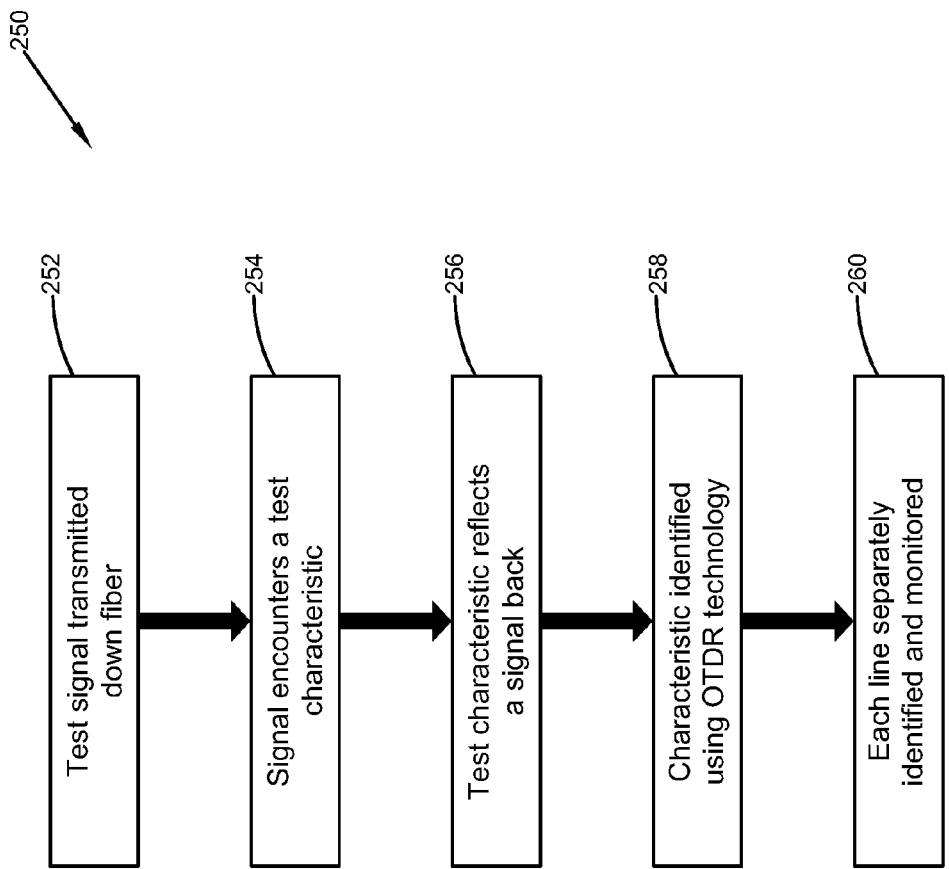
FIG. 7 shows a flow chart of the monitoring system in accordance with the principles of the present disclosure.

FIG. 7 is a flow chart illustrating an example method 250 of the passive optical network fiber monitoring system. In this example, the method 250 includes operations 252, 254, 256, 258, and 260.

The operation 252 is performed to transmit a test signal down a fiber cable. The operation 254 is performed such that the test signal encounters a test characteristic of the fiber cable. The test characteristic reflects back a signal in operation 256 back through the fiber cable. In the operation 258, the test characteristic is identified using OTDR technology. The operation 260 allows for the test characteristic to be received at a monitor located at the central office 102 and to determine the condition and specifically identify each line of the physical layer of the fiber cable.

From the forgoing detailed description, it will be evident that modifications and variations can be made without departing from the spirit and scope of the disclosure.

What is claimed is:

1. An optical splitter assembly comprising:
   a splitter housing;
   a passive optical power splitter positioned within the splitter housing; and
   a plurality of splitter output pigtails that extend outwardly from the splitter housing, each one of the plurality of splitter output pigtails including an optical fiber structure having a first end optically coupled to the passive optical power splitter and a second end spliced inside a fiber optic connector to a fiber stub supported within a ferrule of the fiber optic connector, each one of the fiber stubs of the plurality of splitter output pigtails having a different fiber cut-off wavelength as compared to the other fiber stubs such that each one of the plurality of splitter output pigtails have a unique test characteristic and are individually identified during optical network testing.

2. The optical splitter assembly of claim 1, wherein optical network testing is performed using an optical time domain reflectometer.

3. A system for testing an optical network, comprising:
   a splitter housing;
   a passive optical power splitter positioned within the splitter housing;
   a plurality of splitter output pigtails that extend outwardly from the splitter housing, each of the splitter output pigtails including an optical fiber structure having a first end optically coupled to the passive optical power splitter and a second end spliced inside a fiber optic connector to a fiber stub supported within a ferrule of the fiber optic connector, each one of the fiber stubs of the plurality of splitter output pigtails having a different fiber cut-off wavelength as compared to the other fiber stubs such that each one of the plurality of splitter output pigtails have a unique test characteristic and are individually identified during optical network testing;
   an optical time domain reflectometer coupled to a wavelength division multiplexer; and a feeder fiber connected to the wavelength division multiplexer;

the optical time domain reflectometer transmitting a test signal through the wavelength division multiplexer and the feeder fiber, the test signal passing through the passive optical power splitter to allow the optical time domain reflectometer to continuously monitor each one of the plurality of splitter output pigtails.

4. A method of testing a fiber optic cable in the optical splitter assembly of claim 1, the method comprising:

transmitting a test signal through a wavelength division multiplexer and down the fiber optic cable;

passing the test signal through a passive optical power splitter;

encountering a test characteristic via the test signal;

reflecting a signal back through the fiber optic cable via the test characteristic;

identifying the test characteristic using an optical time domain reflectometer;

identifying separately each one of a plurality of splitter output pigtails of the fiber optic cable from the test characteristic; and monitoring continuously each one of the identified plurality of splitter output pigtails individually through the passive optical power splitter to determine the condition.

* * * * *